US008032291B2

(12) United States Patent
Surnilla et al.

(10) Patent No.: US 8,032,291 B2
(45) Date of Patent: Oct. 4, 2011

(54) METHOD FOR DETECTION OF EMISSIONS LEVELS DURING EXTENDED ENGINE SPEED CONTROLLED OPERATION

(75) Inventors: Gopichandra Surnilla, West Bloomfield, MI (US); Bala Chander, Canton, MI (US); Nate Trask, Dearborn, MI (US); Shane Elwart, Ypsilanti, MI (US); Stephen B. Smith, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 474 days.

(21) Appl. No.: 12/350,084

(22) Filed: Jan. 7, 2009

(65) Prior Publication Data

US 2010/0174468 A1 Jul. 8, 2010

(51) Int. Cl.

*G06F 19/00* (2011.01)
*B60Q 1/00* (2006.01)
*F02D 11/10* (2006.01)
*F02B 77/08* (2006.01)

(52) U.S. Cl. ........ 701/109; 701/103; 701/114; 340/438; 123/198 D; 123/396

(58) Field of Classification Search .................. 123/346, 123/348, 350, 352, 361, 396, 399, 402, 403, 123/198 D, 494; 701/101–103, 109–112, 114, 115; 340/438, 439; 60/274, 277, 285
See application file for complete search history.

(56) References Cited

U.S. PATENT DOCUMENTS

| | | | | |
|---|---|---|---|---|
| 5,333,703 | A | 8/1994 | James et al. | |
| 5,337,722 | A | 8/1994 | Kurihara et al. | |
| 5,626,014 | A * | 5/1997 | Hepburn et al. | 60/274 |
| 6,393,357 | B1 * | 5/2002 | Holmes et al. | 701/115 |
| 6,429,019 | B1 | 8/2002 | Goldstein et al. | |
| 2005/0052027 | A1 | 3/2005 | Priem | |

FOREIGN PATENT DOCUMENTS

| | | | | |
|---|---|---|---|---|
| JP | 59060067 | A * | 4/1984 | 123/198 D |
| JP | 08156574 | | 6/1996 | |
| JP | 2000/146174 | | 5/2000 | |

* cited by examiner

*Primary Examiner* — Willis Wolfe, Jr.
(74) *Attorney, Agent, or Firm* — Allan J. Lippa; Alleman Hall McCoy Russell & Tuttle LLP

(57) ABSTRACT

A method for detection of emissions levels during extended engine speed controlled operation is provided. The method includes monitoring mass airflow passing through the engine while operating the engine. The method further includes adjusting mass airflow responsive to engine speed to maintain a desired engine speed. The method further includes shutting down the engine when engine mass airflow becomes higher than a predetermined mass airflow threshold.

20 Claims, 5 Drawing Sheets

METHOD FOR DETECTION OF EMISSIONS LEVELS DURING EXTENDED ENGINE SPEED CONTROLLED OPERATION

FIELD

The present application relates to a system for detecting emissions levels of an engine vehicle in an extended speed controlled operation.

BACKGROUND

Carbon monoxide (CO) and carbon dioxide (CO2) emissions can accumulate when a vehicle operates at extended speed controlled conditions, for example at idle speed, in an enclosed environment. Oxygen (O2) is involved in combustion reactions that produce CO and CO2, and both are emitted from an exhaust tailpipe. As these concentrations increase, the engine may begin to act like an exhaust gas recirculation system (EGR), taking in higher concentrations of CO and CO2 via the intake manifold.

A method for detecting CO is described in U.S. Pat. No. 5,333,703, wherein the vehicle includes cabin and external CO sensors. When the sensors detect a predetermined maximum carbon oxide threshold of CO, the engine can be disabled if the vehicle is in neutral or park mode.

However, CO sensors present an additional cost in the manufacturing of a vehicle. In contrast, the subject application presents a low-cost, or even no-cost, solution for estimating O2, CO, and CO2 concentrations when the engine is in extended speed controlled conditions.

A method for detection of emissions levels during extended engine speed controlled operation is provided. The method includes monitoring mass airflow passing through the engine while operating the engine. The method further includes adjusting mass airflow responsive to engine speed to maintain a desired engine speed. The method further includes shutting down the engine when engine mass airflow becomes higher than a predetermined mass airflow threshold.

By using an airflow sensor, such as an air meter, in the intake manifold of an engine, O2 concentration, CO concentration, and CO2 concentration (herein referred to as [O2], [CO], and [CO2]) may be estimated. A mass airflow increase during extended operation of an engine under speed controlled conditions (e.g., engine idle speed) indicates a decrease in intake [O2]; that is, as the engine seeks to achieve stoichiometric conditions for combustion in a reduced [O2] situation, a request to increase mass airflow to the engine is executed. Using predetermined relationships between at least mass airflow rate, engine power, [CO2], [CO], and [O2], concentrations of these constituent gases may be estimated. Thus, when concentration of one or more constituent gases exceeds a predetermined maximum carbon oxide threshold or becomes less than a predetermined minimum oxygen threshold, a method for disabling the engine can be employed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE DRAWINGS

Figure 1:
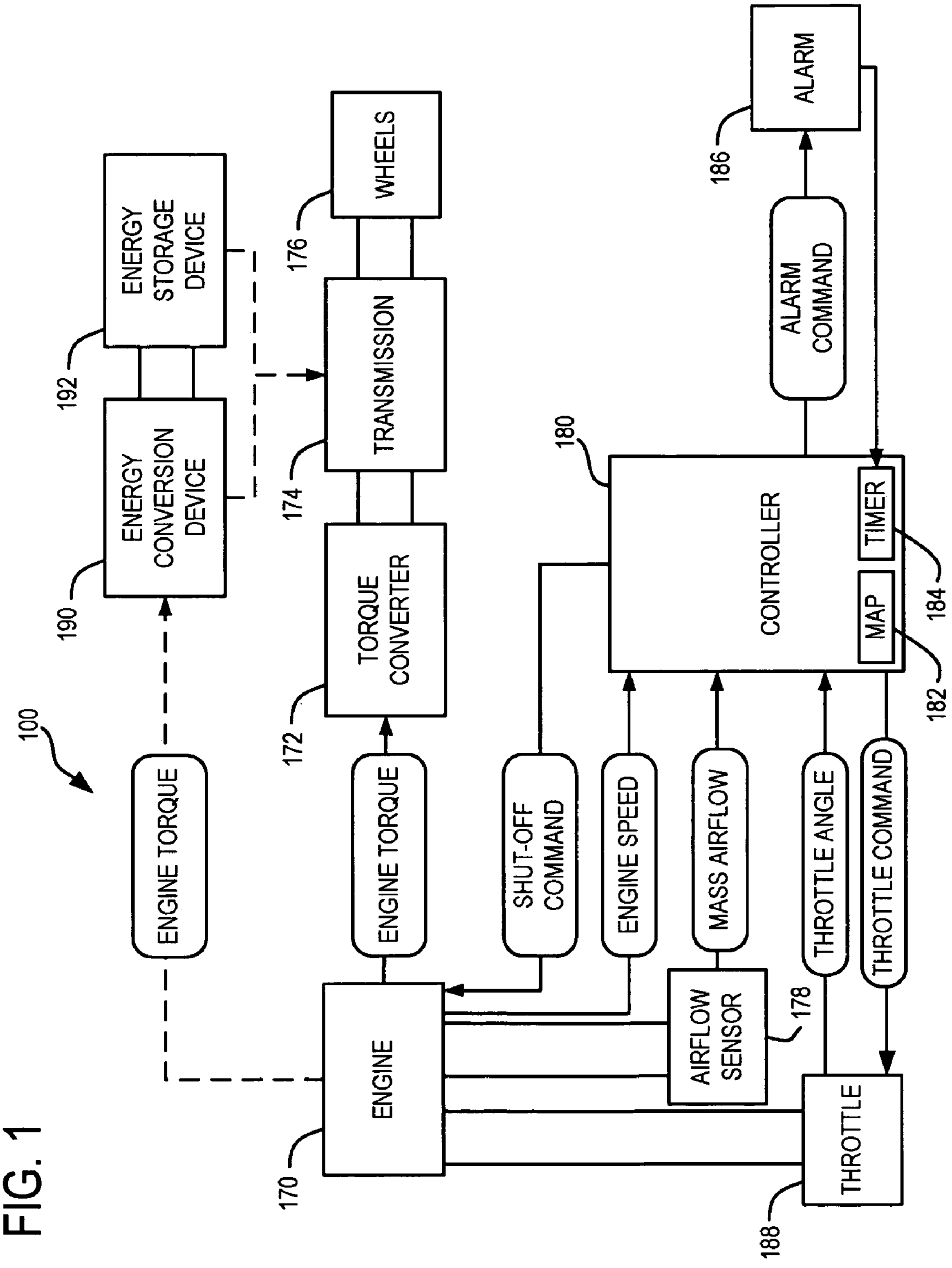
FIG. 1 is a block diagram of an embodiment of a system for detecting engine emissions.
Figure 2:
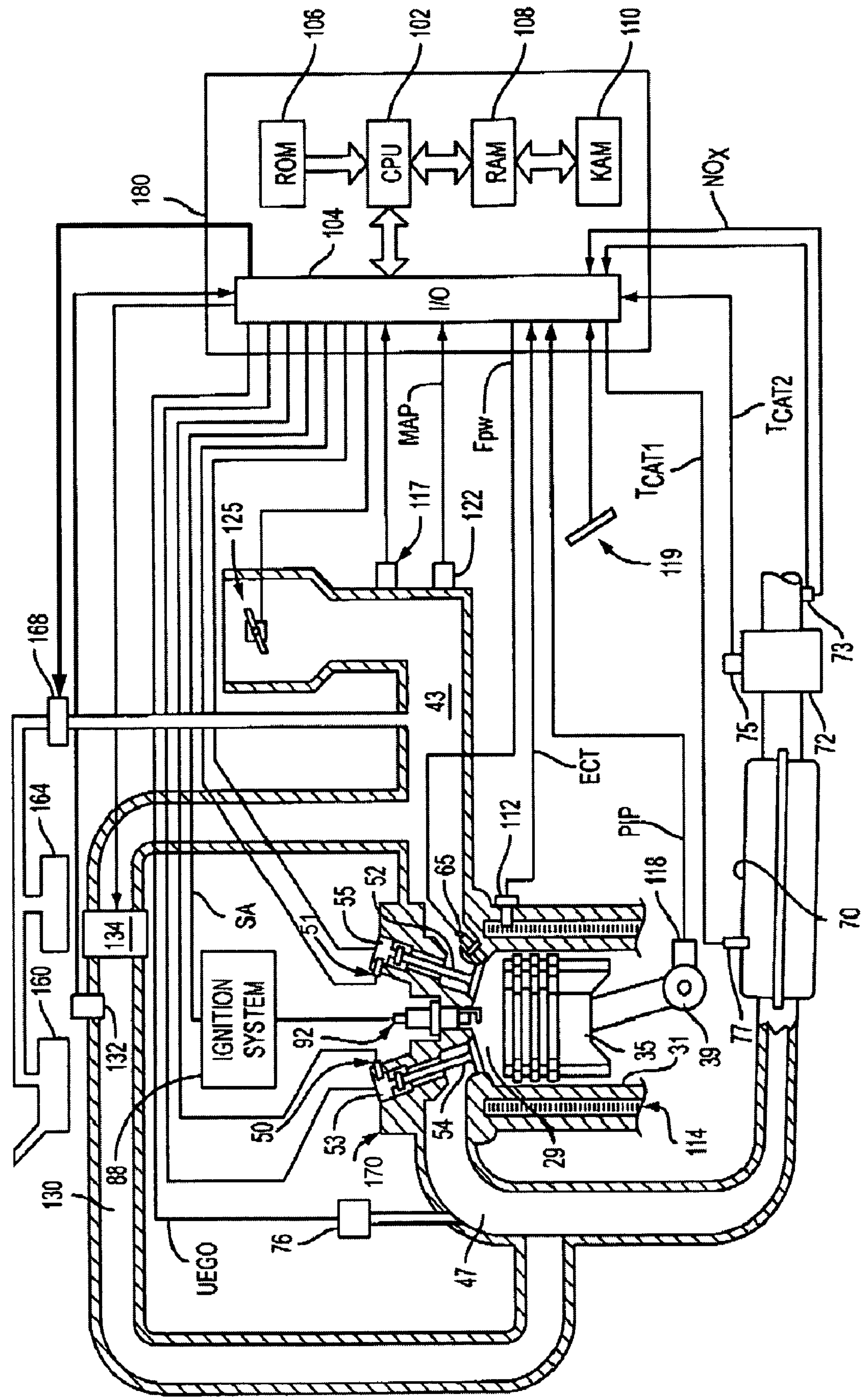
FIG. 2 is a schematic view of an example cylinder of a direct injection engine with an electronic valve actuation system, which may be used in the system of FIG. 1.

FIG. 1 is a block diagram of an embodiment of a system for detecting engine emissions. The system includes a vehicle drivetrain and an electronic controller that receives mass airflow and throttle parameters and sends commands to various components of the system, based on parameters received. FIG. 2 is a schematic view of an example cylinder of a direct injection engine with an electronic valve actuation system, showing further details of a cylinder of the engine of FIG. 1, for example.

Figure 3A:
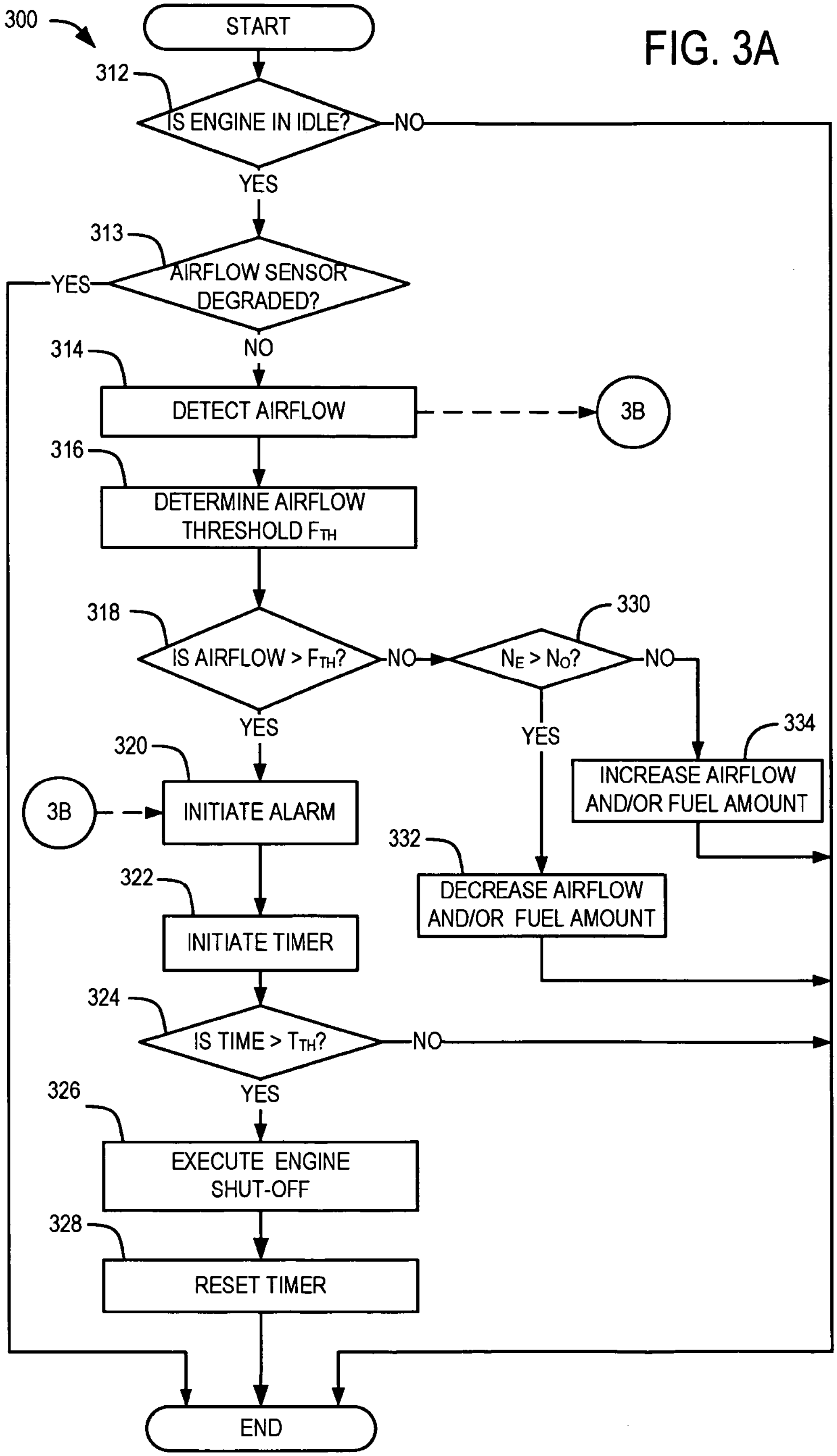
FIG. 3A is a flowchart illustrating an embodiment of a method for engine idle speed control and detection of mass airflow and automatic engine shut-off conditions.

FIG. 3A shows an exemplary flowchart illustrating an embodiment of a method for engine idle speed control and detection of mass airflow and automatic engine shut-off conditions during extended idling conditions. Further, FIG. 3B details a continuation of the flowchart of FIG. 3A illustrating steps for estimation of constituent gas concentrations including carbon dioxide concentration (herein referred to as [CO2]), carbon monoxide concentration (herein referred to as [CO]), and oxygen concentration (herein referred to as [O2]). The constituent gas concentrations are estimated and compared to predetermined maximum carbon oxide thresholds and a predetermined minimum oxygen threshold to determine if the engine should be shut off. As is described with respect to the graphs of FIG. 4 and FIG. 5, an elevated mass airflow during engine idling mode indicates [CO2] is elevated. An elevated [CO2] is associated with reduced [O2]; in an enclosed space, the intake manifold will take in this elevated [CO2] and begin to act like an EGR circuit. Accordingly, the electronic controller may send a command for increased mass airflow to pass through the intake manifold as the engine seeks adequate [O2] for combustion in a cylinder.

The predetermined mass airflow threshold, predetermined maximum carbon oxide threshold, and/or predetermined minimum oxygen threshold may be determined by looking up a value in a prestored map of values relating mass airflow to [CO2], [CO], and/or [O2]. In one example, mass airflow may be correlated with [CO2] such that it may be determined if [CO2] is above a predetermined maximum carbon oxide threshold, based on measured mass airflow.

The values in the prestored map described above may be estimated values. Alternately, the predetermined maximum carbon oxide threshold and the predetermined minimum oxygen threshold may by computed with an estimator algorithm, taking other parameters, such as engine load, into account.

Referring to FIG. 1, the figure schematically depicts a system 100 for controlling a vehicle including an engine 170 while operating in extended speed controlled conditions. This system may include an internal combustion engine 170, further described herein with reference to FIG. 2, which may output engine torque to a torque converter 172 coupled to a transmission 174. The transmission 174 may be a manual transmission, an automatic transmission, or combinations thereof. Transmission 174 is shown coupled to vehicle wheels 176.

Further, the engine 170 may include an intake manifold including a mass airflow sensor 178 or otherwise coupled to a mass airflow sensor 178, which sends a mass airflow measure to an electronic controller 180. The system may include an electronic controller 180 which may include a map 182 of constituent gas concentrations and mass airflow such that constituent gas concentrations may be estimated by mass airflow. The map 182 may include values accounting for engine power output. The electronic controller 180 may determine a predetermined mass airflow based on the map 182, and compare actual mass airflow to the predetermined mass airflow threshold. The electronic controller 180 may also include a timer 184 to measure a time period of mass airflow; in one example, this may be included in the determination of a predetermined mass airflow threshold. Further, the system 100 may include an alarm 186 configured to initiate based on measured mass airflow and estimated constituent gas concentrations.

Thus, the electronic controller 180 may be configured to compare measured mass airflow to a predetermined mass airflow threshold and configured to compare estimated constituent gas concentrations to a predetermined maximum carbon oxide threshold or a predetermined minimum oxygen threshold. The electronic controller 180 may be further configured to initiate the alarm 186 and shut down the engine 170 if one or more of the predetermined mass airflow threshold, the predetermined maximum carbon oxide threshold, or the predetermined minimum oxygen threshold is met.

Further still, engine speed is received at the electronic controller 180. To maintain engine idle speed, the electronic controller 180 can generate and send a throttle command to a throttle 188 based on current measured throttle angle received at the electronic controller 180.

In another embodiment, the vehicle may be a hybrid engine vehicle, indicated by the dashed lines. The hybrid engine vehicle may include an energy conversion device 190 (e.g., an electric motor) coupled to the engine 170. Further, the hybrid engine vehicle may include an energy storage device 192 (e.g., a battery), which may store energy to drive the energy conversion device 190 coupled to the transmission 174. Hybrid propulsion embodiments may include full hybrid systems, in which the vehicle can run on just the engine, just the energy conversion device (e.g. motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used.

The exemplary hybrid propulsion system is capable of various modes of operation. In an example full hybrid implementation, the propulsion system may operate using an energy conversion device 190 (e.g., a motor) as the torque source propelling the vehicle. In another mode, for example when the battery is being charged, engine 170 may be turned on and thus act as the torque source powering the vehicle wheels 176. Alternately, if the battery is being charged and the vehicle is operating under extended speed controlled conditions, the engine 170 may be providing energy to a generator, such as a generator built into a vehicle or a portable generator, as some examples. In this case, the engine 170 may operate under low load conditions, such as in engine idle speed mode, as one example. In another example, the hybrid vehicle may be a plug-in vehicle, and the engine may operate under high load conditions, for example powering a generator and/or battery which is in turn, supplying power to a house, for example. In such a case, the engine 170 may be operating at speeds higher than engine idle speed.

Referring now to FIG. 2, this schematic view shows one cylinder of a multi-cylinder engine, as well as the intake and exhaust path connected to that cylinder. Internal combustion engine 170 is shown in FIG. 2 as a direct injection gasoline engine with a spark plug; however, engine 170 may utilize port injection exclusively or in conjunction with direct injection. In an alternative embodiment, a port fuel injection configuration may be used where a fuel injector is coupled to intake manifold 43 in a port, rather than directly to combustion chamber 29.

Engine 170 includes combustion chamber 29 and cylinder walls 31 with piston 35 positioned therein and connected to crankshaft 39. Combustion chamber 29 is shown communicating with intake manifold 43 and exhaust manifold 47 via respective intake valve 52 and exhaust valve 54. While one intake and one exhaust valve are shown, the engine may be configured with a plurality of intake and/or exhaust valves. FIG. 2 merely shows one cylinder of a multi-cylinder engine, and each cylinder has its own set of intake/exhaust valves, fuel injectors, spark plugs, etc.

In some embodiments, intake valve 52 and exhaust valve 54 may be controlled by electric valve actuators (EVA) 55 and 53, respectively. Valve position sensors 50 and 51 may be used to determine the position of the valves such as for example, fully opened, fully closed, or another position in between.

In some embodiments, combustion cylinder 29 can be deactivated by at least stopping the supply of fuel supplied to combustion cylinder 29 for at least one cycle. During deactivation of combustion cylinder 29, one or more of the intake and exhaust valves can be adjusted to control the amount of air passing through the cylinder. In this manner, engine 170 can be configured to deactivate one, some or all of the combustion cylinders, thereby enabling variable displacement engine (VDE) operation.

Engine 170 is further shown configured with an exhaust gas recirculation (EGR) system configured to supply exhaust gas to intake manifold 43 from exhaust manifold 47 via EGR passage 130. The amount of exhaust gas supplied by the EGR system can be controlled by EGR valve 134. Further, the exhaust gas within EGR passage 130 may be monitored by an EGR sensor 132, which can be configured to measure temperature, pressure, gas concentration, etc. Under some conditions, the EGR system may be used to regulate the temperature of the air and fuel mixture within the combustion chamber, thus providing a method of controlling the timing of combustion by autoignition.

Engine 170 is also shown having fuel injector 65 coupled thereto for delivering liquid fuel in proportion to the pulse width of signal FPW from electronic controller 180 directly to combustion chamber 29. As shown, the engine may be configured such that the fuel is injected directly into the engine cylinder, which is known to those skilled in the art as direct injection. Distributorless ignition system 88 provides ignition spark to combustion chamber 29 via spark plug 92 in response to electronic controller 180. Universal Exhaust Gas Oxygen (UEGO) sensor 76 is shown coupled to exhaust manifold 47 upstream of catalytic converter 70. The signal from sensor 76 can be used to advantage during feedback air/fuel control in a conventional manner to maintain average air/fuel at stoichiometry during the stoichiometric homogeneous mode of operation.

FIG. 2 further shows engine 170 configured with an aftertreatment system comprising a catalytic converter 70 and a lean NOx trap 72. In this particular example, temperature Tcat1 of catalytic converter 70 is measured by temperature sensor 77 and temperature Tcat2 of lean NOx trap 72 is measured by temperature sensor 75. Further, gas sensor 73 is shown arranged in exhaust manifold 47 downstream of lean NOx trap 72, wherein gas sensor 73 can be configured to measure the concentration of NOx and/or 02 in the exhaust gas.

In some embodiments, the engine may include a fuel vapor purging system for purging fuel vapors to the combustion chamber. As one example, fuel vapors originating in fuel tank 160 may be stored in fuel vapor storage tank 164 until they are purged to intake manifold 43 via fuel purge valve 168. Fuel vapor purge valve 168 may be connected to electronic controller 180. Furthermore, the position of the fuel vapor purge valve may be varied by the control system to provide fuel vapors to the combustion chamber during select operating conditions.

Electronic controller 180 is shown in FIG. 2 as a conventional microcomputer including: microprocessor 102, input/output ports 104, and read-only memory 106, random access memory 108, keep alive memory 110, and a conventional data bus. Electronic controller 180 is shown receiving various signals from sensors coupled to engine 170, in addition to those signals previously discussed, including: engine coolant temperature (ECT) from temperature sensor 112 coupled to cooling sleeve 114; a pedal position sensor 119 coupled to an accelerator pedal; a measurement of engine manifold pressure (MAP) from pressure sensor 122 coupled to intake manifold 43; a measurement (ACT) of engine air charge temperature or manifold temperature from temperature sensor 117; and an engine position sensor 118 from a Hall effect sensor sensing crankshaft 39 position. In some embodiments, the requested wheel output can be determined by pedal position, vehicle speed, and/or engine operating conditions, etc. In one aspect of the present description, engine position sensor 118 produces a predetermined number of equally spaced pulses for a revolution of the crankshaft from which engine speed (RPM) can be determined.

Storage medium read-only memory 106 can be programmed with computer readable data representing instructions executable by microprocessor 102 for performing the methods described below as well as other variants that are anticipated but not specifically listed.

In some embodiments, electronic controller 180 can be configured to control operation of the various systems described above with reference to FIG. 1. For example, the energy storage device 192 may be configured with a sensor that communicates with electronic controller 180, thereby enabling a determination to be made of the state of charge or quantity of energy stored by the energy storage device 192. In another example, electronic controller 180 or other controller can be used to vary a condition of the energy conversion device 190 and/or transmission 174. Further, in some embodiments, electronic controller 180 may be configured to cause combustion chamber 29 to operate in various combustion modes, as described herein. The fuel injection timing may be varied to provide different combustion modes, along with other parameters, such as EGR, valve timing, valve operation, valve deactivation, etc.

Combustion in engine 170 can be of various types/modes, depending on operating conditions. In one example, spark ignition (SI) can be employed where the engine utilizes a sparking device, such as spark plug coupled in the combustion chamber, to regulate the timing of combustion chamber gas at a predetermined time after top dead center of the expansion stroke. In one example, during spark ignition operation, the temperature of the air entering the combustion chamber is considerably lower than the temperature required for autoignition. While SI combustion may be utilized across a broad range of engine torque and speed it may produce increased levels of NOx and lower fuel efficiency when compared with other types of combustion.

Another type of combustion that may be employed by engine 170 uses homogeneous charge compression ignition (HCCI), or controlled autoignition (CAI), where autoignition of combustion chamber gases occurs at a predetermined point after the compression stroke of the combustion cycle, or near top dead center of compression. Typically, when compression ignition of a pre-mixed air and fuel charge is utilized, fuel is normally homogeneously premixed with air, as in a port injected spark-ignited engine or direct injected fuel during an intake stroke, but with a high proportion of air to fuel. Since the air/fuel mixture is highly diluted by air or residual exhaust gases, which results in lower peak combustion gas temperatures, the production of NOx may be reduced compared to levels found in SI combustion. Furthermore, fuel efficiency while operating in a compression combustion mode may be increased by reducing the engine pumping loss, increasing the gas specific heat ratio, and by utilizing a higher compression ratio.

In compression ignition operation mode, it may be desirable to exercise close control over the timing of autoignition. The initial intake charge temperature directly affects the timing of autoignition. The start of ignition is not directly controlled by an event such as the injection of fuel in the standard diesel engine or the sparking of the spark plug in the spark ignited engine. Furthermore, the heat release rate is not controlled by either the rate or duration of the fuel-injection process, as in the diesel engine, or by the turbulent flame propagation time, as in the spark-ignited engine.

Note that autoignition is also a phenomenon that may cause knock in a spark-ignited engine. Knock may be undesirable in spark-ignited engines because it enhances heat transfer within the cylinder and may burn or damage the piston. In controlled compression ignition operation, with its high air-to-fuel ratio, knock does not generally cause degradation of the engine because the diluted charge keeps the rate of pressure rise low and the maximum temperature of the burned gases relatively low. The lower rate of pressure rise mitigates the damaging pressure oscillations characteristic of spark ignition knock.

In comparison to a spark ignition engine, the temperature of the charge at the beginning of the compression stroke typically may be increased to reach autoignition conditions at or near the end of the compression stroke. It will be appreciated by those skilled in the art that numerous other methods may be used to elevate initial charge temperature. Some of these include: heating the intake air (heat exchanger), keeping part of the warm combustion products in the cylinder (internal EGR) by adjusting intake and/or exhaust valve timing, compressing the inlet charge (turbo-charging and supercharging), changing the autoignition characteristics of the fuel provided to the engine, and heating the intake air charge (external EGR).

During HCCI combustion, autoignition of the combustion chamber gas may be controlled to occur at a desired position of the piston or crank angle to generate desired engine torque, and thus it may not be necessary to initiate a spark from a sparking mechanism to achieve combustion. However, a late timing of the spark plug, after an autoignition temperature should have been attained, may be utilized as a backup ignition source in the case that autoignition does not occur.

Note that a plurality of other parameters may affect both the peak combustion temperature and the required temperature for efficient HCCI combustion. These and any other applicable parameters may be accounted for in the routines embedded in engine electronic controller 180 and may be used to determine optimum operating conditions. For example, as the octane rating of the fuel increases, the required peak compression temperature may increase as the fuel requires a higher peak compression temperature to achieve ignition. Also, the level of charge dilution may be affected by a variety of factors including both humidity and the amount of exhaust gases present in the intake charge. In this way, it is possible to adjust engine parameters to compensate for the effect of humidity variation on autoignition, i.e., the effect of water makes autoignition less likely.

In one particular example, autoignition operation and combustion timing may be controlled by varying intake and/or exhaust valve timing and/or lift to, for example, adjust the amount of residual trapped gasses. Operating an engine in HCCI using the gas trapping method can provide fuel-efficient combustion with extremely low engine out NOx emissions.

However, the achievable HCCI window of operation for low engine speed and/or low engine load may be limited. That is, if the temperature of the trapped gas is too low, then HCCI combustion may not be possible at the next combustion event. If it is necessary to switch out of HCCI and into spark ignition mode during low load in which temperatures may fall too low, and then to return back into HCCI operation once conditions are acceptable, there may be penalties in engine emissions and fuel economy and possible torque/NVH disruption to the driver during each transition. Therefore, in one embodiment, a method that enables additional operation in HCCI or other limited combustion mode at high or low speeds and loads is described herein utilizing an alternative torque source, such as an energy conversion device/generator. Furthermore, extending the low load limit of HCCI operation, for one or more cycles, to obtain increased benefit from HCCI operation may be desirable.

While one or more of the above combustion modes may be used in some examples, still other combustion modes may be used, such as stratified operation, either with or without spark initiated combustion.

As discussed above, a hybrid propulsion system may be operated in a variety of different modes. Various inputs may be used to select from among the different modes, and/or to control operation of the hybrid propulsion system while operating in a given mode. Example inputs include engine speed, vehicle speed, requested torque, catalyst temperature, manifold pressure, air/fuel ratio, catalyst temperature and/or status of aftertreatment systems, throttle position, accelerator pedal position, requested power, adaptively-learned drive behavior, operating temperature conditions, humidity, etc., status of climate controls, PIP, state of charge (SOC) in hybrid-electric vehicle, etc.

Referring now to FIG. 3A, an example method 300 for engine operation during extended speed controlled conditions (e.g., extended idle conditions) including monitoring the mass airflow passing through the engine is illustrated. The method may include adjusting mass airflow responsive to engine speed to maintain a desired engine idle speed and shutting down the engine when engine mass airflow becomes higher than a predetermined mass airflow threshold.

Specifically, if it is determined that the engine speed is in engine idle mode at 312, the method may include determining if a mass airflow sensor, located in the intake manifold 43, for example, is degraded at 313. If the answer is yes at 313, the routine may end. If the answer is no at 313, the method may further include detecting a mass airflow at an intake passage of the engine via the mass airflow sensor at 314. As another example, mass airflow at an intake passage of the engine may be measured by measuring throttle angle and, accordingly, the predetermined mass airflow threshold may be a throttle angle threshold.

The predetermined mass airflow threshold $F_{TH}$ is determined at 316 and the detected mass airflow is compared to $F_{TH}$ at 318. The method may further include initiating an alarm at 320 if the detected mass airflow exceeds the predetermined mass airflow threshold $F_{TH}$. A timer is initiated at 322. The timer may measure duration of the state of the electronic controller in which it has been determined that mass airflow is above a first predetermined mass airflow threshold $F_{TH}$.

Thus, if it is determined that a time period from the initiation of vehicle alarm has exceeded a predetermined time threshold $T_{TH}$ 324, a command to execute engine shut-off 326 is sent to the engine 170 and the timer is reset 328. In this way, the engine may be shut down when engine mass airflow becomes higher than a predetermined mass airflow threshold wherein the predetermined mass airflow threshold is measured over a time period. Alternately, the engine may be shut down when the engine mass airflow becomes higher than the predetermined mass airflow threshold, and the predetermined mass airflow threshold may be computed as a cumulative mass airflow over a time period. If the time since alarm initiation has not exceeded a predetermined time threshold $T_{TH}$ 324, the routine ends. This step may be useful for preventing premature engine shut-off if mass airflow increases transiently, for example.

In this example, if mass airflow does not exceed the predetermined mass airflow threshold $F_{TH}$ at 318, engine speed may be maintained within a predetermined engine speed range (e.g., engine idle speed range) by adjusting one or more of the mass airflow, fuel pulse width, fuel pulse timing, and/or valve timing. In one example, mass airflow and fuel amount are increased in response to decreases in engine idle speed and mass airflow and fuel amount are decreased in response to increases in engine idle speed. It may be appreciated that mass airflow adjustments may be made by adjusting the throttle angle.

Specifically, it is determined if the actual engine speed $N_E$ is greater than the desired engine speed $N_O$ at 330. If the answer is yes, mass airflow may be decreased by decreasing mass airflow via adjustments to the throttle angle and/or by decreasing fuel injection amount at 332. If the answer is no at 330 and $N_E$ is less than $N_O$, mass airflow may be increased by increasing the throttle angle and/or by increasing the fuel injection amount at 334.

Figure 3B:
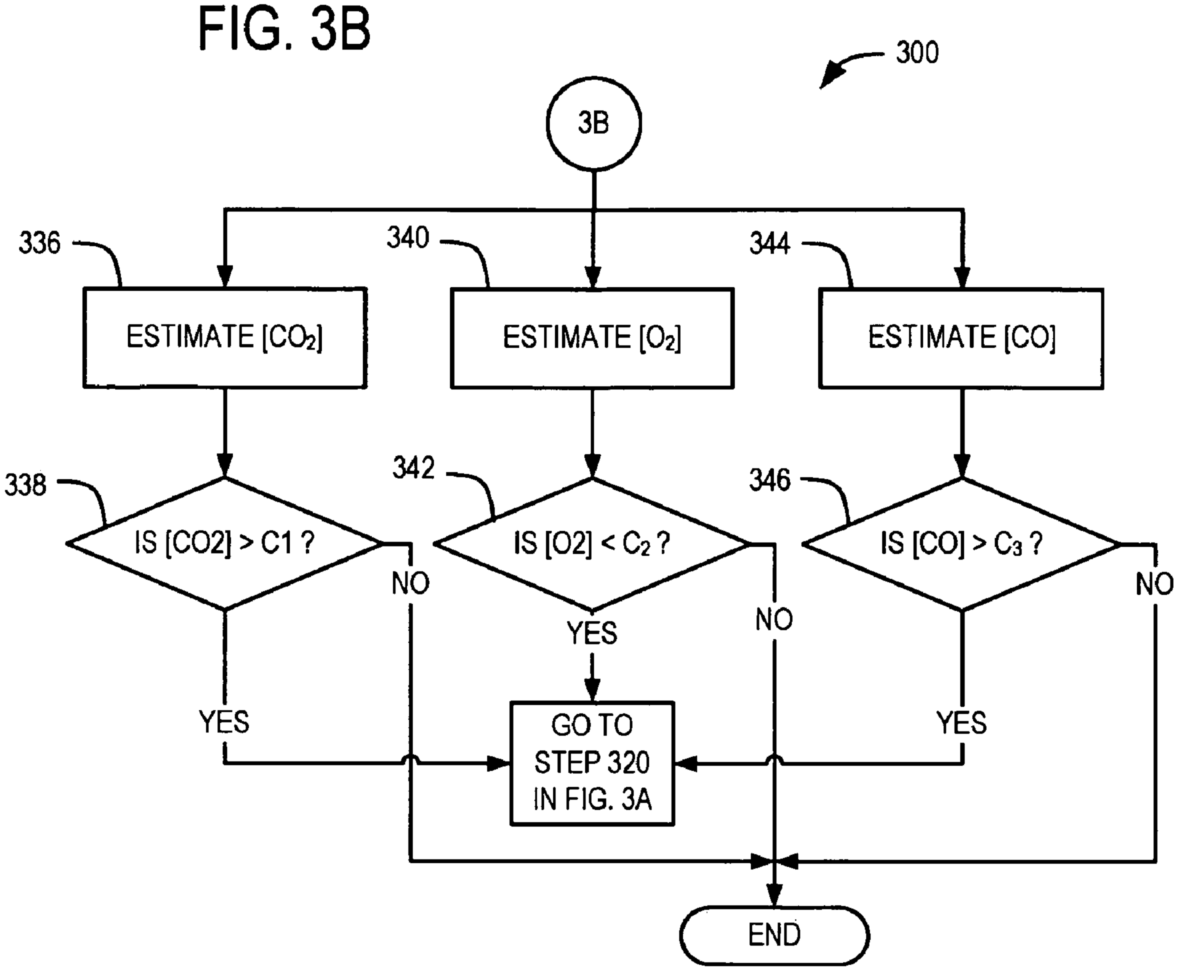
FIG. 3B is a continuation of the flowchart of FIG. 3A illustrating steps for estimation of constituent gas concentrations and comparison to predetermined maximum carbon oxide thresholds and to a predetermined minimum oxygen threshold.

In an alternate procedure, mass airflow may be detected at 314 and the routine may proceed to FIG. 3B which illustrates example steps of the method 300 including estimating constituent gas concentrations based on mass airflow and comparing constituent gas concentrations to predetermined maximum carbon oxide thresholds and the predetermined minimum oxygen threshold. In this example, constituent gas concentrations may include [CO2], [O2], and/or [CO]. In one example, the method may include correlating an increase in mass airflow to an increase in [CO2] and a decrease in [O2] in ambient air.

For example, an estimate of [CO2] is made at 336 based on mass airflow, by accessing values in a prestored map of mass airflow and [CO2], for example. If [CO2] exceeds a predetermined maximum carbon oxide threshold, $C_1$, at 338 the routine proceeds to step 320. If the answer is no at 338, the routine ends. Similarly, [O2] may be estimated at 340 by accessing values in a prestored map of mass airflow and [O2], for example. If [O2] is below a predetermined minimum oxygen threshold, $C_2$, at 342 the routine proceeds to step 320. In this example, [CO] may be estimated at 344, by accessing values in a prestored map of mass airflow rate and [CO], for example. If [CO] exceeds a predetermined maximum carbon oxide threshold, $C_3$, at 346 the routine proceeds to step 320. In one example, if the answer is no at steps 338, 342, and 346, the routine ends. In another example, if the answer is yes for at least one of the steps 338, 342, or 346, the routine proceeds to step 320. Thus, in one example, the method may include initiating an alarm at 320 if an alarm criterion is met wherein an alarm criterion is one or more of the [CO2] concentration greater than the predetermined maximum carbon oxide threshold and the oxygen concentration less than the predetermined minimum oxygen threshold. Further, the method may include shutting down the engine if an estimate of [CO2] and/or the estimate of [CO], based on mass airflow measured at the intake manifold, are greater than the predetermined maximum carbon oxide threshold or if the estimate of [O2] based on mass airflow measured at the intake manifold is less than a predetermined minimum oxygen threshold.

Further still, a timer may be initiated at 322 to measure duration of the state of the electronic controller 180 in which it has been determined that at least one of the constituent gas concentrations is greater than the predetermined maximum carbon oxide thresholds (e.g., C1, C3) or is less than a predetermined minimum oxygen threshold (e.g., C2)

Thus, the alarm may be initiated and/or the engine may be shut down if the estimate of carbon dioxide concentration and/or carbon monoxide concentration based on mass airflow measured in the intake manifold exceeds the predetermined maximum carbon oxide threshold. Further, the predetermined maximum carbon oxide threshold may be computed over a time period. Alternately, the alarm may be initiated and/or the engine may be shut down if the estimate of oxygen concentration based on mass airflow measured in the intake manifold is less than the predetermined minimum oxygen threshold wherein the predetermined minimum oxygen threshold is computed over a time period. As an additional alternate, it may be appreciated that the engine may be shut down if the estimate of carbon dioxide concentration based on mass airflow measured in the intake manifold exceeds the predetermined maximum carbon oxide threshold wherein the predetermined maximum carbon oxide threshold is computed as a cumulative carbon dioxide concentration over a time period. Likewise, the engine may be shut down if the estimate of oxygen concentration based on mass airflow measured in the intake manifold is less than the predetermined minimum oxygen threshold. Alternately, the predetermined minimum oxygen threshold may be computed as a cumulative oxygen concentration over a time period. It may be appreciated that the maximum carbon oxide threshold may include different maximum thresholds for carbon monoxide concentration and carbon dioxide concentration.

Figure 4:
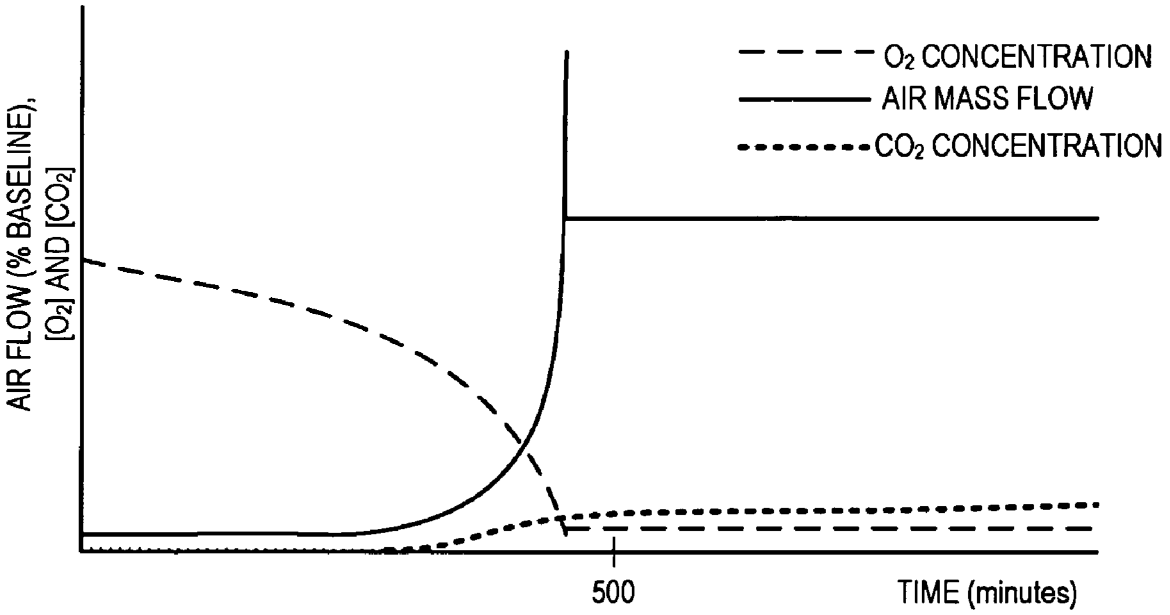
FIG. 4 is a graph showing example mass airflow change concurrent with oxygen concentration and carbon dioxide concentration change over time when engine is in idle.
Figure 5:
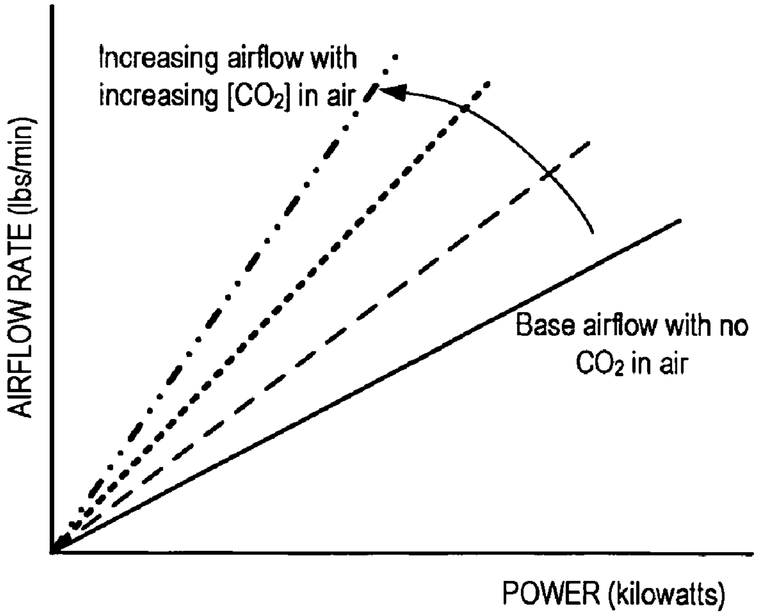
FIG. 5 is a graph that shows an example of mass airflow rate as a function of power output of an engine, including an instance when there is no carbon dioxide in the air and other instances with increasing carbon dioxide concentration.

The relationships between mass airflow, [O2], and [CO2] are illustrated in FIG. 4 and changes based on engine power output are further described in FIG. 5. Thus, a prestored map of mass airflow and maximum carbon dioxide thresholds may be developed based on these relationships, as one example.

FIG. 4 depicts changes in mass airflow (expressed as a percentage of baseline mass airflow during engine idle mode), [O2], and [CO2] through the intake manifold 43 of an engine 170 in engine idle mode in a closed environment. In this example, as time progresses, [O2] decreases because the engine continues to output CO2 through the exhaust tailpipe in the absence of adequate ventilation. As a result of the decreased [O2], the electronic controller 180 may request a greater mass airflow to the engine 170 to meet stoichiometric [O2] demands and thus to achieve a desired air-fuel ratio and maintain idle engine speed. In this case, at approximately 450 minutes, mass airflow reaches a maximum while [O2] has concurrently decreased. It may be appreciated that the mass airflow may reach a maximum value earlier or later than depicted depending on, for example, engine load, temperature, etc. In the application described herein, the predetermined maximum carbon oxide thresholds and the predetermined minimum oxygen threshold for engine automatic shut-off may be configured such that they are below this mass airflow maximum.

FIG. 5 shows the changing relationship between engine power and mass airflow rate through the intake manifold 43 as a function of [CO2]. It is known that, without CO2 in the environment, there is a base mass airflow rate (solid line) through an intake manifold 43. As [CO2] increases, the slope of this line increases as indicated (dashed lines). The slope increase is one measurement by which elevated [CO2] may be detected. Predetermined curves, such as the lines illustrated, based on engine power output, may be stored in the electronic controller 180 or may be determined by an algorithm.

From the graphs, it may be appreciated that the predetermined mass airflow threshold may be computed such that the predetermined mass airflow threshold may increase as engine output power increases, to account for the increased mass airflow that flows through the intake passage of the engine at higher power output levels. Further, curves accounting for other factors such as ambient temperature, exhaust output, etc., may be created and stored in the electronic controller 180 and these may be accounted for prior to initiating the alarm and/or automatic engine shut-off.

Note that the example control and estimation routines that are depicted by the above process flows can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling engine operation during extended speed controlled conditions, comprising:

monitoring mass airflow passing through the engine while operating the engine;

adjusting mass airflow responsive to engine speed to maintain a desired engine speed; and shutting down the engine when engine mass airflow becomes higher than a predetermined mass airflow threshold.

2. The method of claim 1, further comprising initiating an alarm if the mass airflow exceeds the predetermined mass airflow threshold.

3. The method of claim 1, where monitoring the mass airflow passing through the engine includes measuring a mass airflow at an intake passage of the engine via a mass airflow sensor.

4. The method of claim 1, where monitoring the mass airflow passing through the engine includes measuring the mass airflow at an intake passage of the engine by measuring throttle angle and the predetermined mass airflow threshold is a throttle angle threshold.

5. The method of claim 1, wherein the predetermined mass airflow threshold is computed such that the predetermined mass airflow threshold increases as engine power output increases.

6. The method of claim 1, wherein shutting down includes shutting down the engine when engine mass airflow becomes higher than a predetermined mass airflow threshold, and wherein the predetermined mass airflow threshold is measured over a time period.

7. The method of claim 6, wherein shutting down includes shutting down the engine when engine mass airflow becomes higher than the predetermined mass airflow threshold, and wherein the predetermined mass airflow threshold is computed as a cumulative mass airflow over a time period.

8. The method of claim 1, where engine speed is maintained within a predetermined engine speed range by varying one or more of the mass airflow, fuel pulse width, fuel pulse timing, and valve timing, and wherein the predetermined engine speed range is an engine idle speed range.

9. The method of claim 1 further comprising estimating constituent gas concentration based on mass airflow.

10. The method of claim 9 wherein constituent gas is one or more of carbon dioxide, carbon monoxide, and oxygen.

11. The method of claim 10 wherein shutting down includes shutting down the engine if at least one of an estimate of carbon dioxide concentration based on mass airflow measured in an intake manifold and an estimate of carbon monoxide concentration based on mass airflow measured in an intake mass airflow is greater than a predetermined maximum carbon oxide threshold.

12. The method of claim 10 wherein the shutting down includes shutting down the engine when an estimate of oxygen concentration based on mass airflow measured in an intake manifold is less than a predetermined minimum oxygen threshold.

13. A method for controlling engine operation during extended speed controlled conditions, comprising:

adjusting mass airflow responsive to engine speed to maintain a desired engine speed;

correlating an increase in mass airflow to an increase in carbon dioxide concentration and a decrease in oxygen concentration in ambient air wherein the increase in mass airflow is used to maintain engine speed;

shutting down the engine if the carbon dioxide concentration is greater than a predetermined maximum carbon oxide threshold; or shutting down the engine if the oxygen concentration is less than a predetermined minimum oxygen threshold.

14. The method of claim 13, where engine speed control is maintained by adjusting mass airflow and fuel delivered to the engine, wherein mass airflow and fuel amount are increased in response to decreases in engine speed and mass airflow and fuel amount are decreased in response to increases in engine speed, and wherein mass airflow is adjusted by adjusting a throttle angle.

15. The method of claim 14 wherein the desired engine speed is an engine idle speed range.

16. The method of claim 13, further comprising initiating an alarm if an alarm criterion is met, and wherein the alarm criterion is one or more of the carbon dioxide concentration being greater than the predetermined maximum carbon oxide threshold and the oxygen concentration being less than the predetermined minimum oxygen threshold.

17. The method of claim 13 wherein shutting down includes shutting down the engine when at least one of the estimate of carbon dioxide concentration based on mass airflow measured in the intake manifold exceeds the predetermined maximum carbon oxide threshold, wherein the predetermined maximum carbon oxide threshold is computed over a time period, and the estimate of oxygen concentration based on mass airflow measured in the intake manifold is less than the predetermined minimum oxygen threshold, wherein the predetermined minimum oxygen threshold is computed over a time period.

18. The method of claim 17 wherein shutting down includes shutting down the engine when at least one of the estimate of carbon dioxide concentration based on mass airflow measured in the intake manifold exceeds the predetermined maximum carbon oxide threshold, wherein the predetermined maximum carbon oxide threshold is computed as a cumulative carbon dioxide concentration over a time period, and the estimate of oxygen concentration based on mass airflow measured in the intake manifold is less than the predetermined minimum oxygen threshold, wherein the predetermined minimum oxygen threshold is computed as a cumulative oxygen concentration over a time period.

19. A system for controlling a vehicle comprising an engine while operating in extended speed controlled conditions, the system comprising:

an engine with an intake manifold comprising a mass airflow sensor;

a map of constituent gas concentrations and mass airflow such that constituent gas concentrations are estimated by mass airflow;

an alarm configured to initiate based on measured mass airflow and estimated constituent gas concentrations; and an electronic controller configured to compare measured mass airflow to a predetermined mass airflow threshold and configured to compare estimated constituent gas concentrations to a predetermined maximum carbon oxide threshold and a predetermined minimum oxygen threshold, wherein the electronic controller is further configured to initiate the alarm and engine shut-down if one or more of the predetermined mass airflow threshold, predetermined maximum carbon oxide threshold, and predetermined minimum oxygen threshold is met.

20. The system of claim 19 wherein the vehicle is a hybrid engine vehicle comprising an energy conversion device coupled to an engine and an energy storage device coupled to a transmission.

* * * * *